(12) United States Patent
Boulanger et al.

(10) Patent No.: US 7,388,901 B2
(45) Date of Patent: Jun. 17, 2008

(54) METHOD FOR RECEIVING SPECTRUM SPREADING SIGNALS WITH FREQUENCY SHIFT CORRECTION

(75) Inventors: Christophe Boulanger, Ivry-sur-Seine (FR); Laurent Ouvry, Granoble (FR); Bernard Piaget, Vemom (FR); Didier Lattard, Rencurel (FR)

(73) Assignee: Xantima LLC, Las Vegas, NV (US)

( * ) Notice: Subject to any disclaimer, the term of this patent is extended or adjusted under 35 U.S.C. 154(b) by 0 days.

(21) Appl. No.: 11/331,762

(22) Filed: Jan. 13, 2006

(65) Prior Publication Data

US 2006/0133459 A1    Jun. 22, 2006

Related U.S. Application Data

(63) Continuation of application No. 09/856,508, filed on Jun. 15, 2001, now Pat. No. 6,987,796.

(51) Int. Cl.
*H04B 1/00*  (2006.01)

(52) U.S. Cl. ............... 375/150; 375/130; 375/134; 375/136; 375/137; 375/145

(58) Field of Classification Search ............... None
See application file for complete search history.

(56) References Cited

U.S. PATENT DOCUMENTS 5,799,034 A * 8/1998 Walley et al. ............... 375/140
6,278,725 B1 * 8/2001 Rouphael et al. ........... 375/148

OTHER PUBLICATIONS

Zilog, "Z87200 Spread-Spectrum Transceiver", Aug. 1997, figure 1 p. 4-4, and pp. 4-20, 4-21 and 4-47 to 4-49.*
Simon et al, "Doppler-corrected differential detection of MPSK", Transactions on Communications, IEEE vol. 37, Issue 2, Feb. 1989 pp. 99-109.*

* cited by examiner

*Primary Examiner*—Mohammad Ghayour
*Assistant Examiner*—Juan A Torres
(74) *Attorney, Agent, or Firm*—Connolly Bove Lodge & Hutz LLP

(57) ABSTRACT

A method for receiving spectrum spreading signals using a Doppler-effect frequency-shift correction generates a corrective signal based on an estimation of a modulation period related to the Doppler effect detected in a preamble portion of a received signal. The corrective signal is used for correcting an information portion of the received signal. Base band digital signals are operated upon by using the DOT and CROSS components.

5 Claims, 9 Drawing Sheets

METHOD FOR RECEIVING SPECTRUM SPREADING SIGNALS WITH FREQUENCY SHIFT CORRECTION

CROSS-REFRENCE TO RELATED APPLICATION

The present application is a continuation of application Ser. No. 09/856,508 filed Jun. 15, 2001, now U.S. Pat. No. 6,987,796 inventors Boulanger et al.

TECHNICAL FIELD

The object of the present invention is a method for receiving spectrum spreading signals with frequency shift correction. It finds an application in digital transmissions.

With the invention, effects due to untimely frequency shifts may be corrected, regardless of the origin of these shifts. Most often, this will be a Doppler effect related to the moving speed of the receiver. But this might also be effects due to a frequency shift of the local oscillators. In the description which follows, it will be assumed that the effect to be corrected is a Doppler effect, without however limiting the scope of the invention to this case.

PRIOR STATE OF THE ART

A great number of publications have been made on the correction of the Doppler effect. For example, patent U.S. Pat. No. 5,007,068 may be mentioned as well as the corresponding article of M. K. SIMON and D. DIVSALAR entitled "Doppler-Corrected Differential Detection of MPSK", published in the journal, "IEEE Transactions on Communications", Vol. 37, No. 2, February 1989, pages 99-109. These documents describe a technique wherein the Doppler shift is determined on one half of the symbol period. For this purpose, the receiver uses two circuits each with a half period delay, and a Doppler effect estimation circuit connected between the two delay circuits. The correction is then performed on the usual demodulated signal.

This technique may also be used for modulations of the multiple differential phase modulation type (abbreviated as MDPSK for "M-ary Differential Phase Shift Keying"), but it is not applicable to spectrum spreading transmissions where each symbol is multiplied by a pseudo-random sequence.

The article of F. D. NATALI, entitled "AFC Tracking Algorithms," published in the journal, "IEEE Transactions on Communications, vol. COM-32, No. 8, August 1984, pages 935-947, describes a technique in which preambles made up of known symbols are formed before transmitting the useful information. The working frequency is automatically controlled ("Automatic Frequency Control' or AFC) by a loop structure.

The following correction techniques may further be mentioned:
- the use of double detection, which gets rid of the Doppler effect by suitable encoding (U.S. Pat. No. 4,481,640);
- the use of the frequency mixing principle in the radio portion of the receivers (U.S. Pat. No. 4,706,286);
- the use of a phase locked loop (PLL) in the radio portion (U.S. Pat. No. 4,841,544);
- the use of a dual mode with increased throughput (U.S. Pat. No. 5,623,485).

These techniques are generally expensive and complex and do not make the most out of the advantages of spectrum spreading, nor of the digital processing of the signals. The object of the present invention is precisely to overcome these drawbacks by providing a method which processes the signals in the base band (and not the signals in the radio portion) and which is well adapted to digital processing.

Document EP-A-0 822 668 describes a receiver for spectrum spreading signals wherein the Doppler effect correction is performed on the base band signal.

DESCRIPTION OF THE INVENTION

Specifically, the object of the invention is a method for receiving spectrum spreading signals with frequency shift correction, wherein:
- a signal is received comprising a preamble made up from a sequence of known symbols spread in frequency by a pseudo-random sequence, followed by a sequence of information symbols spread in frequency by said pseudo-random sequence,
- a base band signal is formed from the received signal,
- a correlation is performed between the base band signal and the pseudo-random sequence at least in the portion of the signal corresponding to the information symbols, in order to obtain a correlation signal,
- a demodulation of the correlation signal is performed in order to obtain a demodulation signal,
- the information symbols are restored, a method wherein the frequency shift correction comprises the following steps:
  a. in a first step, the demodulation signal is processed in the portion corresponding to the preamble, in order to estimate the period of the modulation affecting the signal because of the frequency shift and a correcting signal with this estimated period is elaborated,
  b. in a second step, the signal is corrected before or after the correlation in the portion corresponding to the information symbols, by means of said correcting signals, the method being characterized in that:
  the base band signal is divided into two components, a first component (I) and a second component (Q) in quadrature with the first and a correlation is performed on each of these components in order to obtain two correlation components CORR (I) and CORR (Q),
  a DOT signal is calculated which is the sum of two direct products of successive samples of the correlation components, and a CROSS signal is calculated which is the difference between two crossed products of successive samples of the correlation components,
  in order to estimate the period (T) of the modulation, the ratio between a CROSS signal and a DOT signal is calculated at each symbol period, the arc is calculated for which the tangent is equal to this ratio, the inverse of this arc is calculated and multiplied by $\pi N/2$.

DESCRIPTION OF THE PARTICULAR EMBODIMENTS

Figure 1:
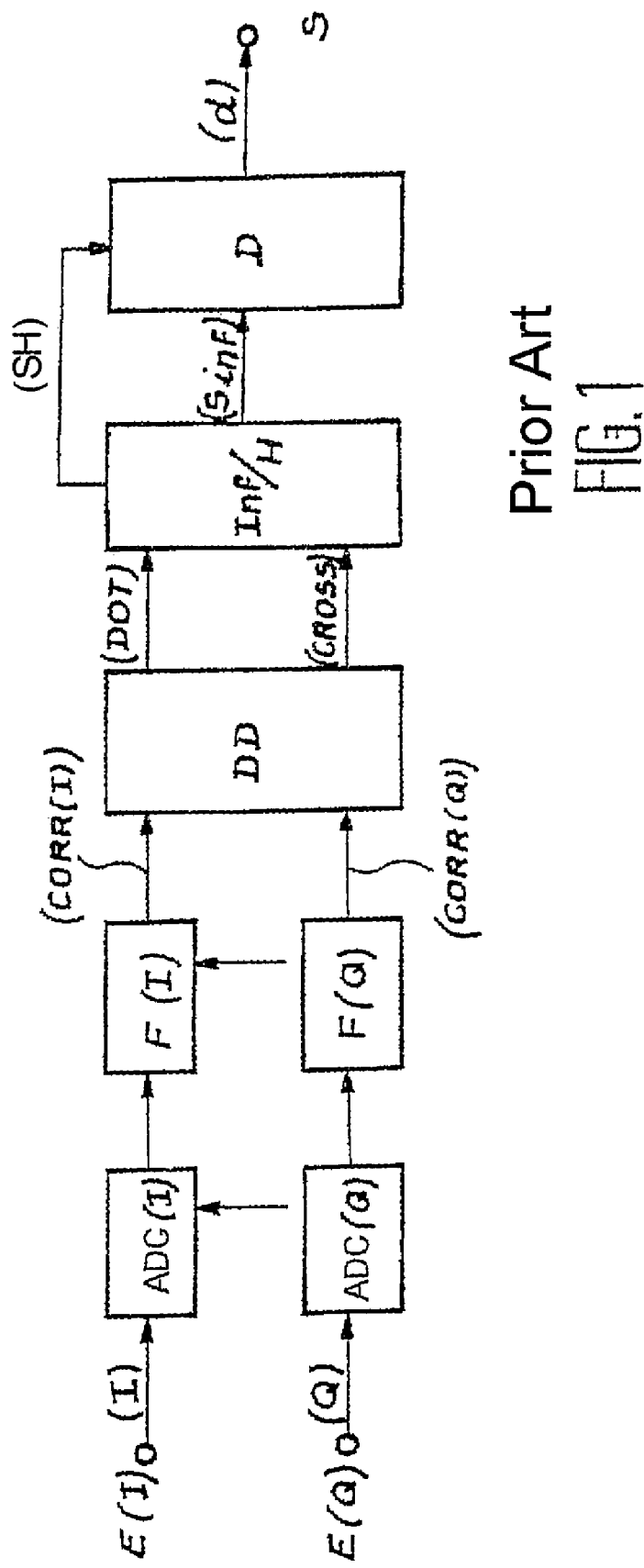
FIG. 1 is a reminder of the general structure of a spreading spectrum signal receiver.

FIG. 1 is a reminder of the general structure of a direct sequence spectrum spreading signal receiver. As an example, it is assumed that the modulation carried out at emission in a phase difference modulation. The receiver comprises means not shown such as an antenna and means for switching to base band, i. e. in order to multiply the received signal by a signal with the frequency of the carrier. The receiver generally includes two parallel channels, marked by indices I and Q, for the processing of a signal in phase quadrature with the carrier. The illustrated receiver thus comprises two inputs E(I), E(Q), two analog-digital converters ADC(I), ADC(Q), two circuits F(I), F(Q) delivering two CORR(I) and CORR(Q) signals, a differential demodulation (DD) circuit delivering two signals, conventionally marked at "DOT" and "CROSS" (which are sums or differences of sample products at the correlation output), a circuit Inf/H restoring an information signal Sinf and a clock signal SH, and finally a decision circuit D, the output of which restores data d.

Circuits F(I), F(Q) perform a correlation operation between the received signal and the pseudo-random sequence used at emission. This operation consists in storing a certain number of successive samples and in performing a weighted sum with the help of coefficients which are the coefficients for direct sequence spectrum spreading. These coefficients are equal to +1 and to −1, according to the sign of the chips forming the pseudo-random sequence.

The analog-digital converters ADC(I) and ADC(Q) operate at frequency $n_e F_c$ where $F_c$ is the frequency of the chip ($F_c=1/T_c$), and $n_e$ is the number of samples taken in a chip period ($T_c$). To simplify the discussion, it will be assumed that one sample is taken per chip. The correlation signals CORR(I) and CORR(Q) contain one correlation peak per symbol period.

As for the DOT and CROSS signals delivered by the demodulation circuit DD, as a reminder, they are for the first, the sum $I_k I_{k-1}+Q_k Q_{k-1}$, and for the second, the difference $Q_k I_{k-1}-I_k Q_{k-1}$, where $I_k$ and $Q_k$ designate the correlation samples of rank k for channels I and Q, the rank corresponding to a symbol period ($I_k$ corresponds to CORR ($I_k$) and $Q_k$ to CORR ($Q_k$)).

Figure 2:
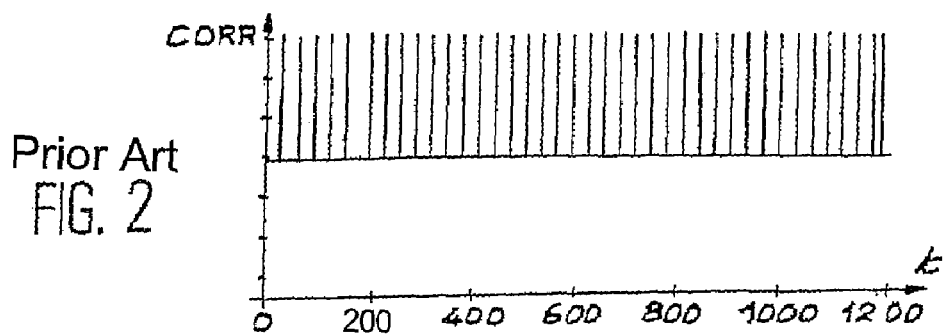
FIG. 2 shows a correlation signal corresponding to a signal not affected by the Doppler effect.

FIG. 2 shows the sequence of the correlation peaks in the ideal case of a preamble made up of binary data each equal to +1, the transmission being not affected by a Doppler effect. FIG. 2 relates both to channel I and channel Q. The time counted in chip periods appears on the abscissa. These peaks are separated from each other by N chips. In the illustrated case, N=31. All the peaks have the same amplitude, in the ideal case, without any noise.

Figure 3:
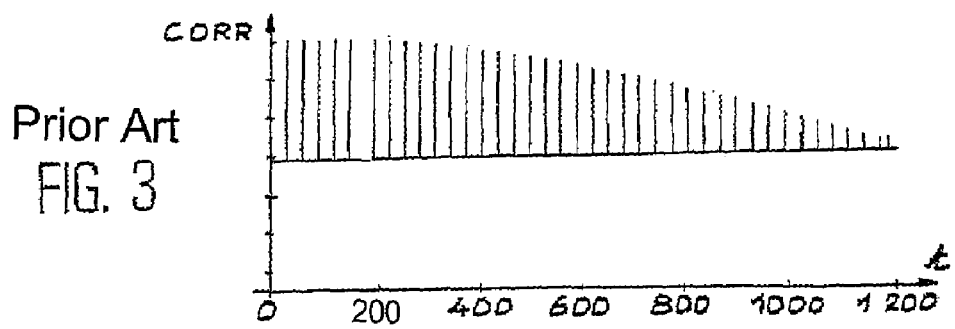
FIG. 3 shows this same signal affected by a slight Doppler effect.
Figure 4:
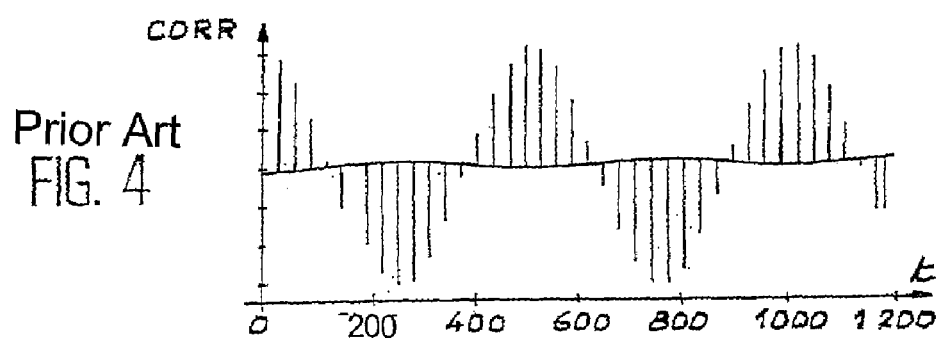
FIG. 4 shows this same signal but with a very strong Doppler effect.

FIG. 3 illustrates the same case, but with a slight Doppler effect, while FIG. 4 illustrates the case of a strong Doppler effect. The frequency shift due to the Doppler effect is expressed by a phase shift of the processed signal and by a parasitic modulation of the correlation signal.

Figure 5:
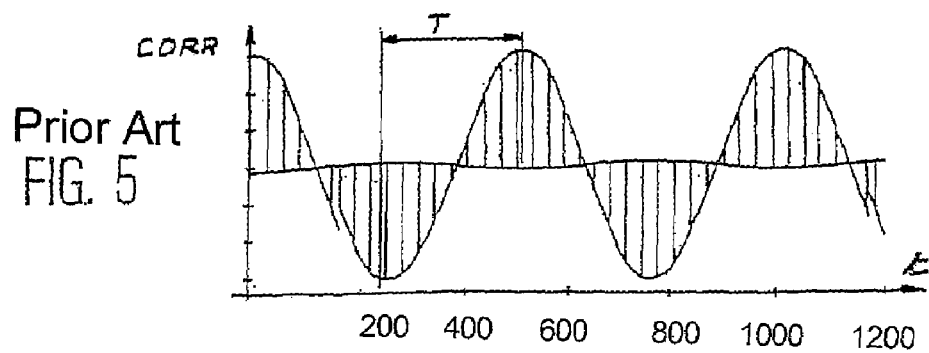
FIG. 5 illustrates the sinusoidal modulation affecting a correlation signal because of the Doppler effect and it shows the period T of this modulation.

FIG. 5 resumes this matter in a more accurate way and shows the modulation related to the perturbation with its half-period marked as T, which is the time (counted in the number of chips) separating two successive extremes. The total period of the parasitic modulation is therefore equal to 2T. The method of the present invention enables this parasitic modulation to be corrected. According to the invention, this is carried out in two steps: first of all, the period T (or its double 2T) is measured, so that a correction signal may be elaborated; then the signals are corrected by said correction signal.

In order to estimate the time T (or 2T), according to the invention, the correlation signals are used as DOT and CROSS signals.

Figure 6:
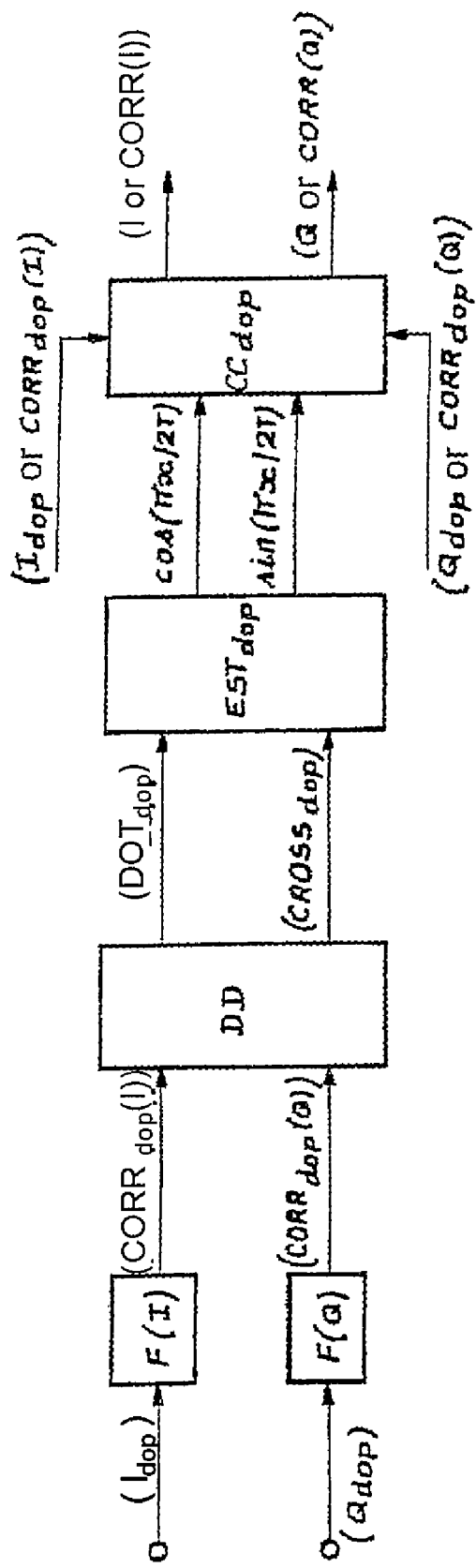
FIG. 6 is a block diagram showing the estimation of the Doppler modulation from the DOT and CROSS demodulation signals.
Figure 7:
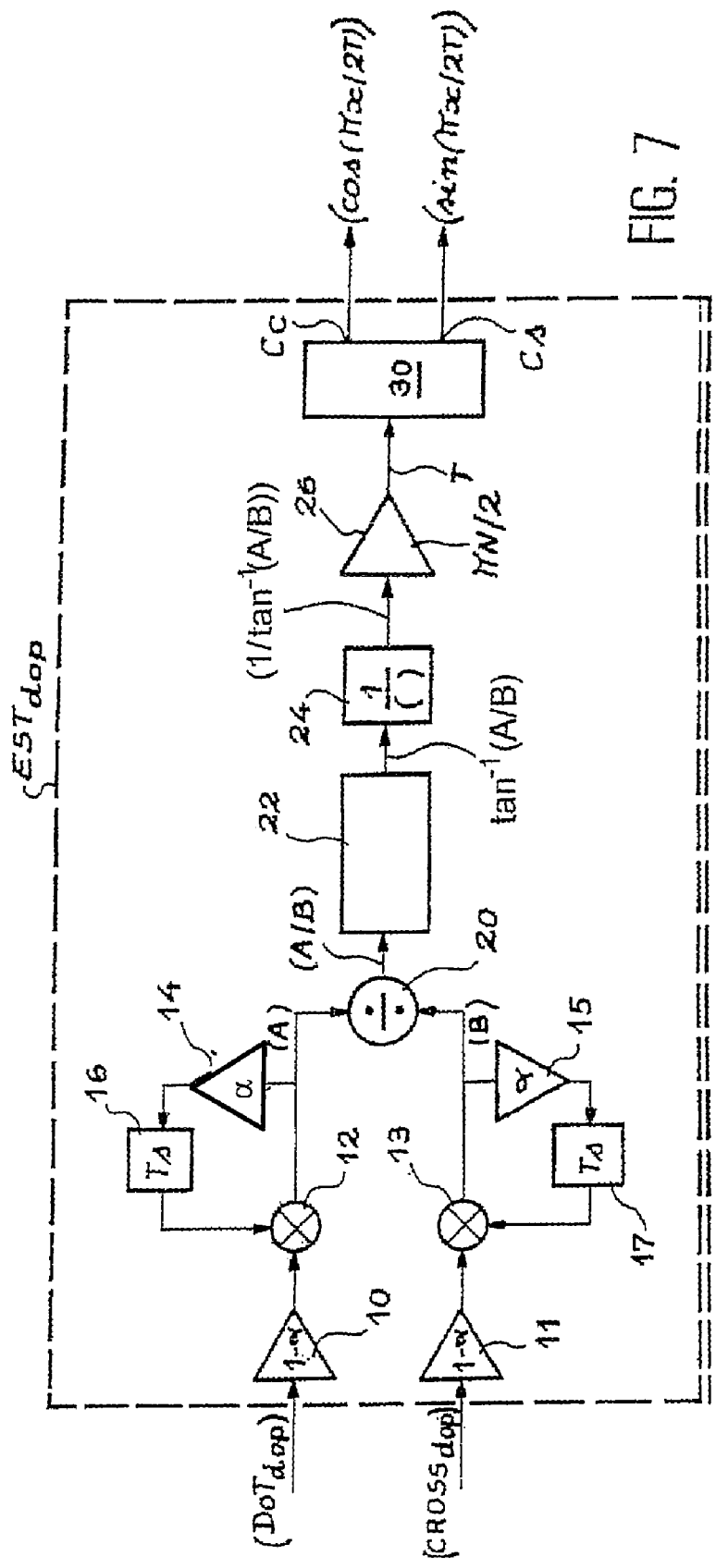
FIG. 7 illustrates an embodiment of a unit for estimating the modulation period and for forming the correction signal for the Doppler effect.
Figure 8:
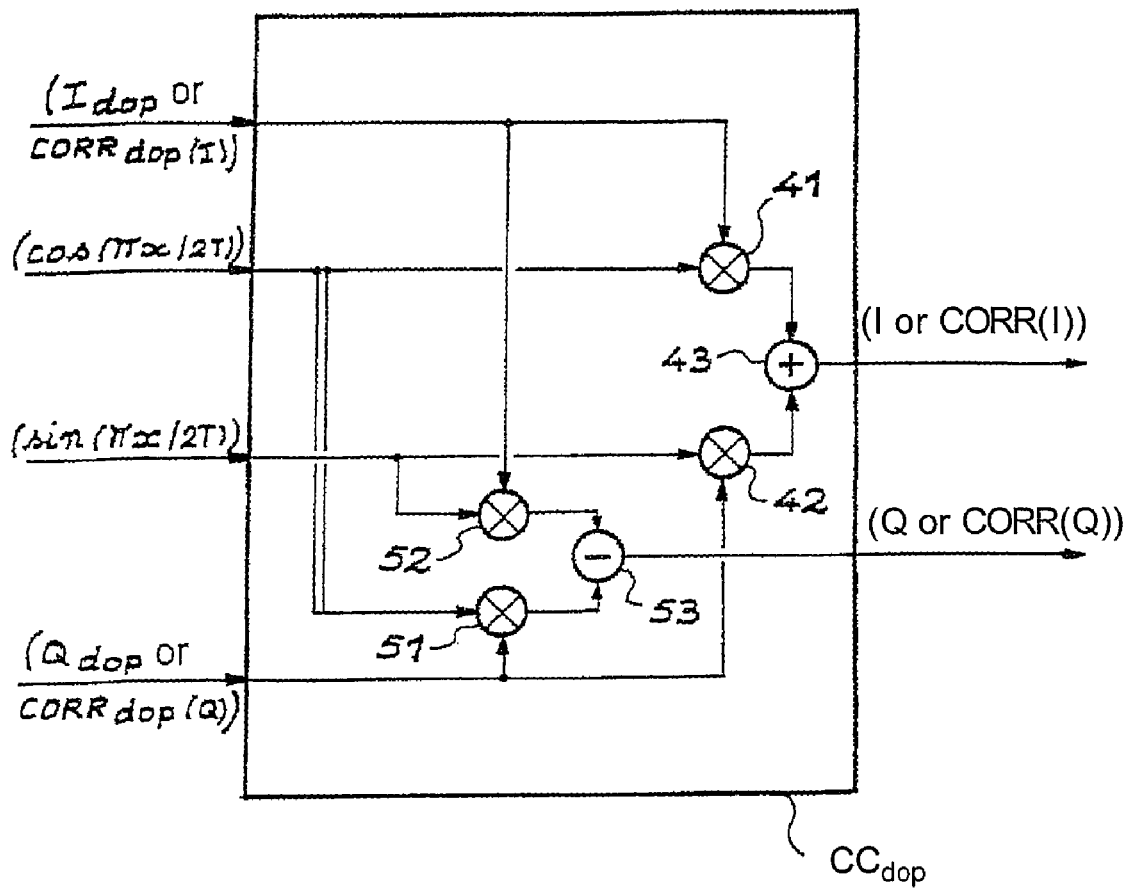
FIG. 8 illustrates an embodiment of a correction circuit for the Doppler effect.

To carry out the correction, either the incident signals or the correlation signals are acted upon. There are therefore several possible alternatives which are illustrated in FIGS. 6-8. In these figures, the notations have been slightly changed with respect to those of FIG. 1, in the sense that the signals before their processing bear a "DOP" index, to notify that they are affected by Doppler effect, the signals after processing being cleared of this index.

In FIG. 6, the Doppler effect estimation circuit $EST_{dop}$ processes demodulation signals $DOT_{dop}(I)$ and/or $CROSS_{dop}(Q)$. Correction is carried out either on $I_{dop}$ and $Q_{dop}$, or on $CORR_{dop}(I)$ and $CORR_{dop}(Q)$, in circuit $CC_{dop}$.

The properties of the signals to be processed are used for determining the period T illustrated in FIG. 5 (or 2T). Indeed, it may be considered that the correlation signals corresponding to a preamble are made up of the samples of a cosine wave and of a sine wave of a half-period T, sampled every kN chips (cf. FIG. 5). This may therefore be written as:

$$CORR_{dop}(I_k)=P\cdot\cos(\pi kN/2T) \quad (1)$$

$$CORR_{dop}(Q_k)=P\cdot\sin(\pi kN/2T) \quad (2)$$

where P is an amplitude.

After differential demodulation, the following DOT and CROSS signals are obtained:

$$DOT_{dop}(k)=CORR_{dop}(I_k)\cdot CORR_{dop}(I_{k-1})+CORR_{dop}(Q_k)\cdot CORR_{dop}(Q_{k-1}) \quad (3)$$

$$CROSS_{dop}(k)=CORR_{dop}(Q_k)\cdot CORR_{dop}(I_{k-1})-CORR_{dop}(I_k)\cdot CORR_{dop}(Q_{k-1}) \quad (4)$$

By replacing in (3), (4) the quantities with their values given by (1) and (2) and taking into account the properties of trigonometric functions, it is found that:

$$DOT_{dop}(k) = P^2 \cdot \cos(\pi N/2T) \quad (5)$$

$$CROSS_{dop}(k) = P^2 \cdot \sin(\pi N/2T) \quad (6)$$

It is seen that both $DOT_{dop}$ and $CROSS_{dop}$ quantities are independent of the rank k of the preamble symbol.

By taking the ratio of these quantities, the tangent of angle $\pi N/2T$ is formed from which the angle and the value of T may be extracted:

$$T = \frac{\pi \cdot N/2}{\tan^{-1}\left(\frac{CROSS_{dop}(k)}{DOT_{dop}(k)}\right)} \quad (7)$$

where $\tan^{-1}(.)$ means "arc for which the tangent is equal to (.)".

The Doppler effect estimation circuit $EST_{dop}$ of FIG. 6 is therefore simply a circuit comprising a divider for signals $A=CROSS_{dop}$ and $B=DOT_{dop}$, a circuit for calculating $\tan^{-1}(A/B)$, an inverter and a multiplier by $N\pi/2$. T being known, a correction signal needs to be generated for which one component Cc is a cosine and the other Cs a sine:

$$Cc = \cos(\pi x/2T) \quad (8)$$

$$Cs = \sin(\pi x/2T) \quad (9)$$

Such a signal is generated by a generator with two quadrature outputs.

This calculation may be changed by taking a sequence of weighted samples and calculating:

$$T = \frac{\pi \cdot N/2}{\tan^{-1}\left[\frac{(1-\alpha) \cdot \sum_{k=0}^{\infty} \alpha^k CROSS_{dop}(k)}{(1-\alpha) \cdot \sum_{k=0}^{\infty} \alpha^k DOT_{dop}(k)}\right]} \quad (10)$$

Still in a more general way, estimation of T is improved by proceeding with low pass filtering of signals $DOT_{dop}$ and $CROSS_{dop}$, i.e., with $A=f(CROSS_{dop}(k))$ and $B=f(DOT_{dop}(k))$, where f represents the filtering function:

$$T = \frac{\pi \cdot N/2}{\tan^{-1}\left[2\frac{A}{B}\right]} \quad (11)$$

A generator receiving T, delivers components Cs and Cs as defined by (8) and (9).

FIG. 7 illustrates a particular embodiment of the estimation circuit. This circuit comprises two amplifiers 10, 11 with gain (1-α), two multipliers 12, 13, the output of which is fed back to a second input as a loop by an amplifier 14, 15 via a delay line 16, 17. The circuit is completed by means for applying the relation (11), i.e., a divider 20, a circuit 22 for calculating the arc tangent, a circuit 24 which calculates the inverse of the arc tangent, and an amplifier 26 with gain $\pi N/2$ which delivers quantity T. A generator 30 receiving T delivers components Cc and Cs as defined by (8) and (9).

Having described the means for obtaining both components Cc and Cs of the correction signal, a description will now be made on how the received signals are corrected accordingly. This correction processes the signals carrying the transmitted information and no longer the preamble.

Generally, the correlation signals CORR(I) and CORR(Q) of the phase and quadrature channels may be considered as real and imaginary components of a complex signal CORR(I)+jCORR(Q). The Doppler effect changes the phase of this signal (in other words, it rotates the vector which represents it) by a quantity $e^{j(\pi x/2T)}$. The obtained signal is the Doppler effect affected signal. Its components are $CORR_{dop}(I)$ and $CORR_{dop}(Q)$. This may be therefore written as:

$$CORR_{dop}(I)+jCORR_{dop}(Q)=[CORR(I)+jCORR(Q)]e^{j(\pi x/2T)} \quad (12)$$

Conversely, the components free from the Doppler effect may be expressed with respect to the components impaired by the Doppler effect as:

$$CORR(I)+jCORR(Q)=[CORR_{dop}(I)+jCORR_{dop}(Q)]e^{-j(\pi x/2T)} \quad (13)$$

By developing the right-hand member of this equation and by identifying the real and imaginary terms, it is found that:

$$CORR(I) = CORR_{dop}(I) \cdot \cos(\pi x/2T) + CORR_{dop}(Q) \cdot \sin(\pi x/2T) \quad (14)$$

$$CORR(Q) = CORR_{dop}(Q) \cdot \cos(\pi x/2T) - CORR_{dop}(I) \cdot \sin(\pi x/2T) \quad (15)$$

The same relationships may be established with signals I and Q, i.e.:

$$[I+jQ] = [I_{dop}+jQ_{dop}]e^{-j(\pi x/2T)} \quad (16)$$

i.e.:

$$I = I_{dop} \cdot \cos(\pi x/2T) + Q_{dop} \cdot \sin(\pi x/2T) \quad (17)$$

$$Q = Q_{dop} \cdot \cos(\pi x/2T) - I_{dop} \cdot \sin(\pi x/2T) \quad (18)$$

The correction circuit must therefore comprise multipliers for multiplying the signals to be corrected by both components of the correction signal, and adders in order to perform the sum of the obtained products. FIG. 8 shows an example of such a circuit. As illustrated, it comprises two multipliers 41 and 42 receiving $I_{dop}$ or $CORR_{dop}(I)$ and $\cos(\pi x/2T)$ for the first and $Q_{dop}$ or $CORR_{dop}(Q)$ and $\sin(\pi x/2T)$ for the second, respectively, and an adder 43 connected to both multipliers in order to deliver the signal from the first channel corrected from the Doppler effect, i.e., I or CORR(I). Similarly, the circuit further comprises two multipliers 51 and 52 receiving $Q_{dop}$ or $CORR_{dop}(Q)$ and $\cos(\pi x/2T)$ for the first and $I_{dop}$ or $CORR_{dop}(I)$ and $\sin(\pi x/2T)$ for the second, respectively, and an adder 53 with an inverting input (in other words a subtractor), the inverting input being connected to multiplier 52 and the other input to multiplier 51. This adder 53 delivers the signal of the second channel corrected from the Doppler effect, i.e., Q or CORR(Q)

FIGS. 9A, 9B and 10A, 10C, on the one hand, as well as 11A, 11B and 12A, 12B, on the other hand, illustrate the correction which has just been described.

Figure 9A:
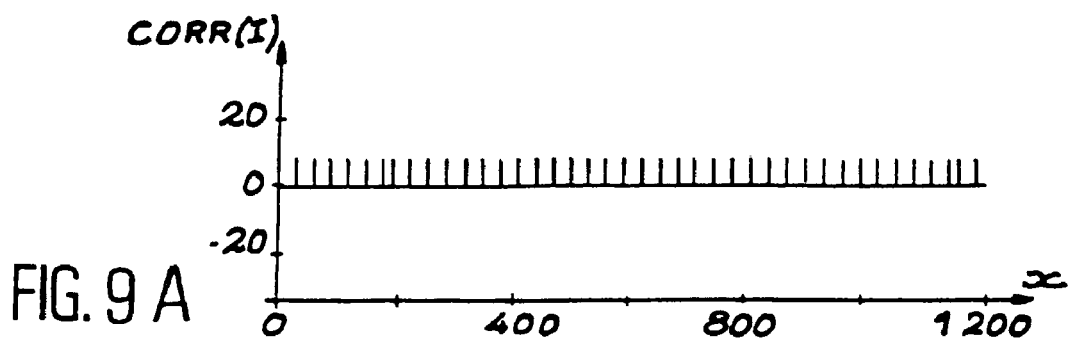
FIGS. 9A and 9B respectively show a correlation signal after and before correction for the I channel.
Figure 9B:
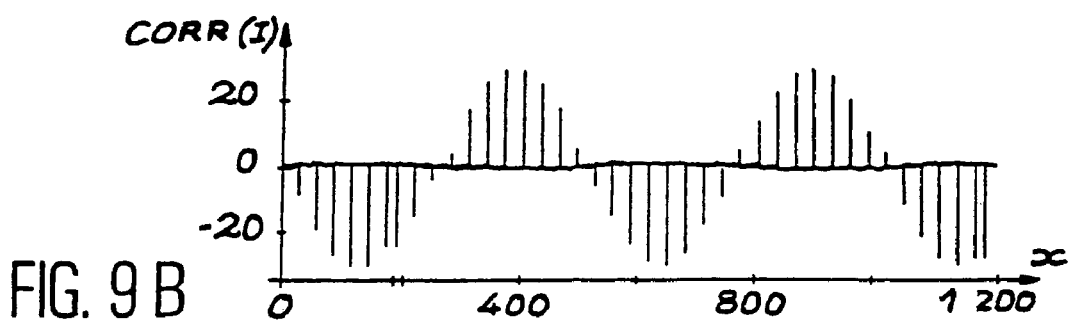

In FIG. 9B, first of all, a correlation signal of channel I is seen before correction and affected by a Doppler effect. In FIG. 9A, this effect has been corrected.

Figure 10A:
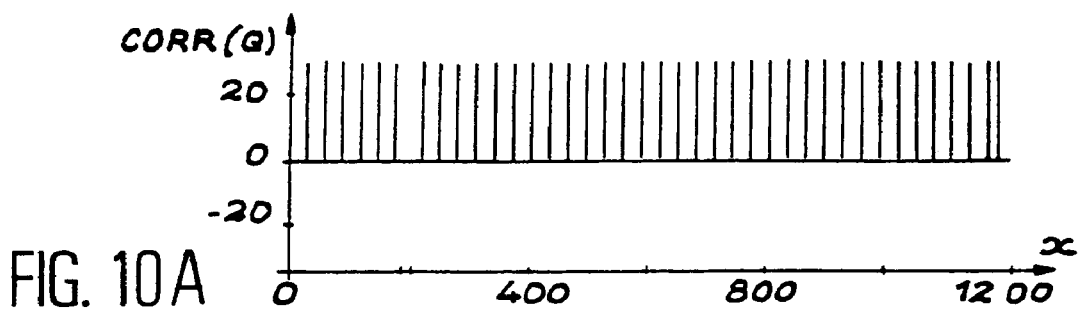
FIGS. 10A and 10B respectively show a correlation signal after and before correction for the Q channel.
Figure 10B:
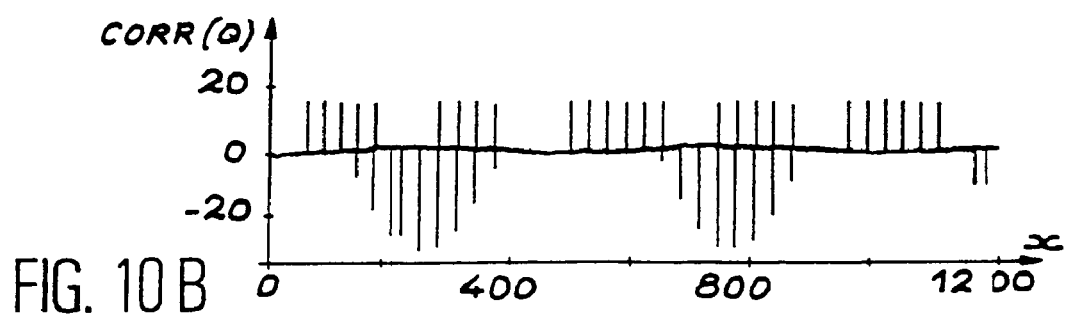
Figure 11:
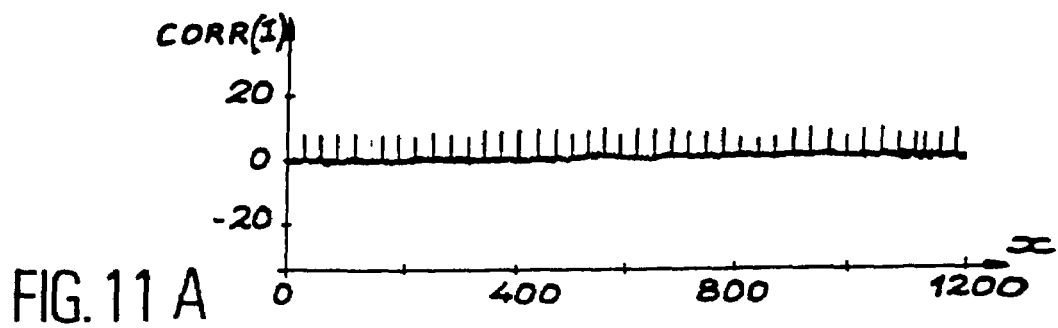
FIGS. 11A and 11B respectively show a correlation signal after and before correction on the I channel, with Gaussian noise.
Figure 11:
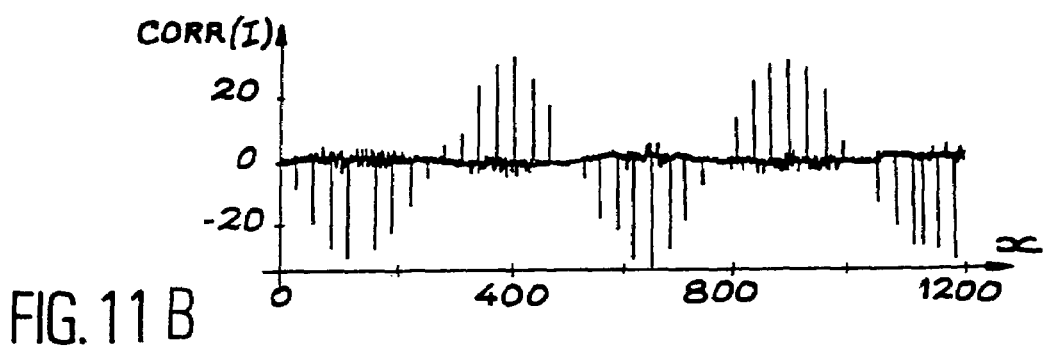
Figure 12:
FIGS. 12A and 12B respectively show a correlation signal after and before correction on the Q channel, with Gaussian noise.
Figure 12:

In FIGS. 10A and 10B, the same signals are seen after and before correction, respectively, but on channel Q.

FIGS. 11A, 11B and 12A, 12B respectively show the same signals as FIGS. 9A, 9B and 10A, 10B, but in the presence of noise such that a signal-to-noise ratio is 5 dB.

The invention is not limited to the case when both channel I and channel Q are corrected. One or the other of these channels might as well be corrected. The correction circuit will then implement the portion of the means required for calculating expressions (17) or (18).

The invention, which has just been described, is applied to any type of pseudo-random sequence spectrum spreading signal receiver. In particular it may be applied to so-called Code Division Multiple Access (CDMA) transmissions. In these transmissions, several users share a same channel by means of different pseudo-random sequences. The receiver then comprises as many parallel channels as users. In a particular embodiment, such a CDMA receiver may comprise parallel suppression means for interference between users, with weighting means. Such a receiver is described in a French patent application filed by the present applicant on Mar. 24, 1998, under number 98 03586.

Figure 13:
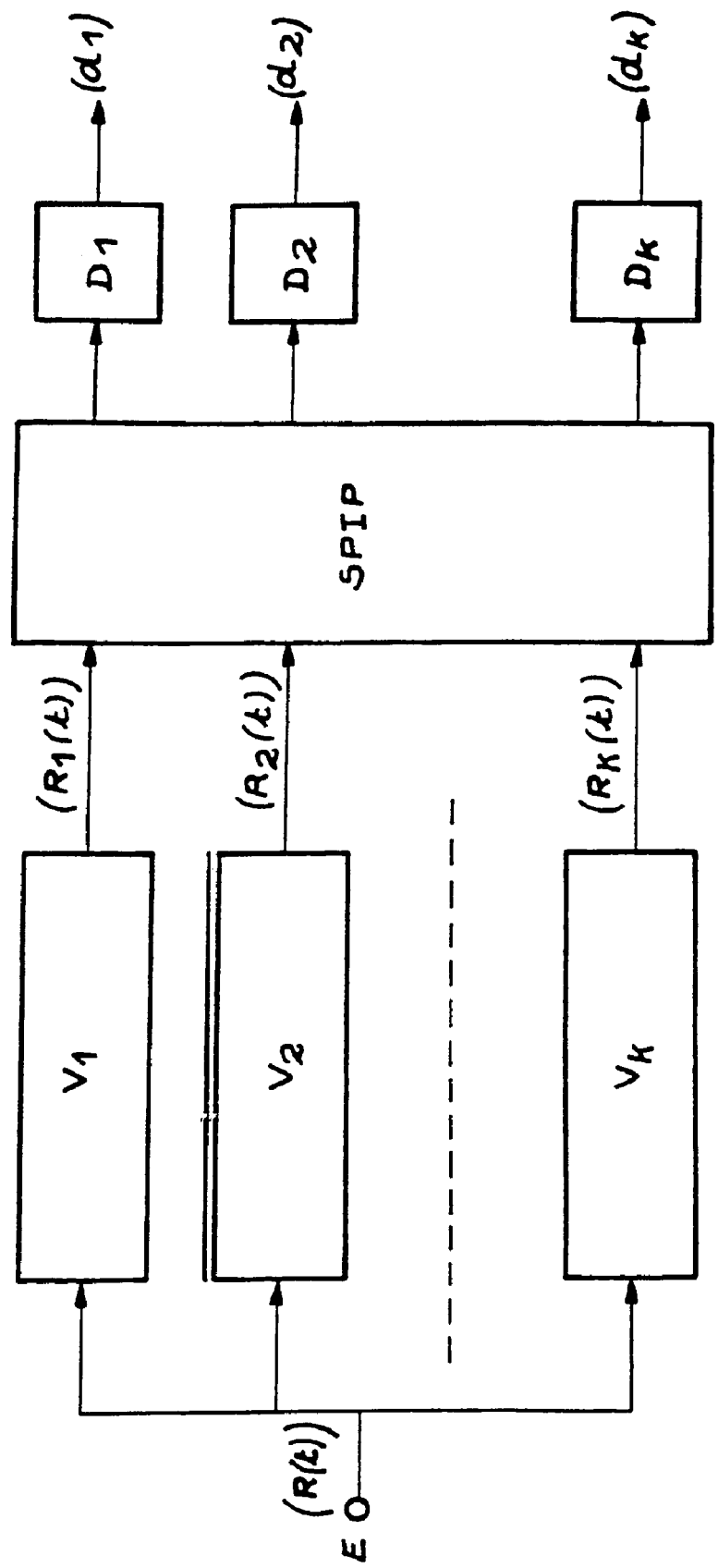
FIG. 13 schematically illustrates the structure of a receiver with parallel suppression of interferences and weighting, with Doppler effect correction according to the invention.

FIG. 13 schematically illustrates such a receiver. As illustrated, it comprises a general input E, receiving a composite signal R(t), K parallel channels $V_1, V_2, \ldots, V_K$, where K is the maximum number of users, each channel delivering a signal $R_1(T), R_2(T), \ldots, R_K(T)$, specific to each user, a weighted interference parallel suppression circuit (SPIP) and K decision circuits $D_1, D_2, \ldots, D_K$, delivering data $d_1, d_2, \ldots, d_K$, specific to each of the users.

Figure 14:
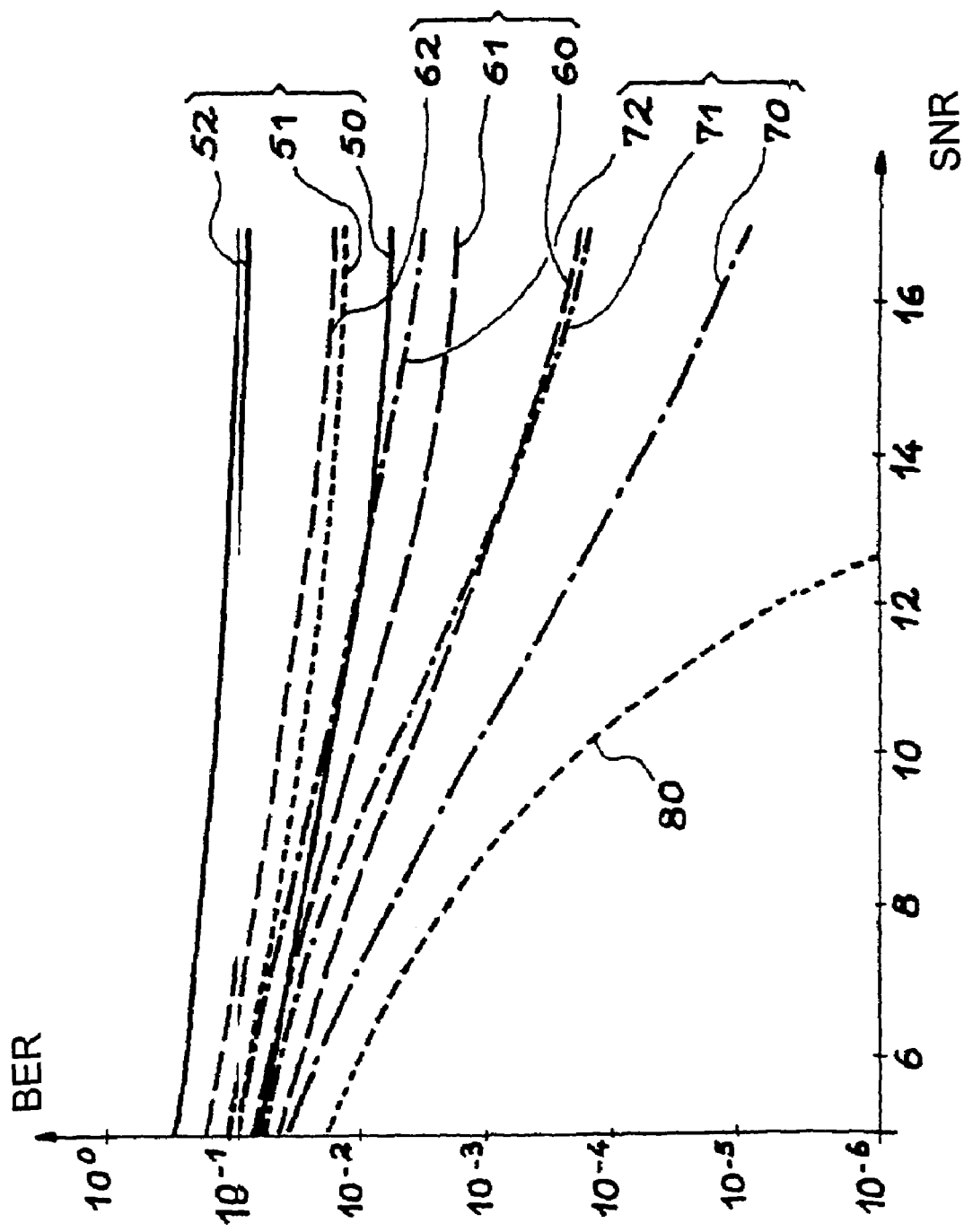
FIG. 14 shows the variations of the bit error rate versus the signal to noise ratio and enables the performances of a receiver according to the invention to be compared with other receivers of known types.

Finally FIG. 14 enables the performances of a receiving method according to the invention to be compared with conventional methods. This FIG. 13 shows the variations of the bit error rate (BER) versus the signal to noise ratio SNR. FIG. 13 makes the assumption of K=5 users with N=63. The Doppler effect was simulated by a shift with respect to the carrier of the local oscillator.

Curve 50 refers to a conventional method with one stage, without interference suppression. Curves 51 and 52 refer to the same method but with two different Doppler effects, the first with a relative shift of $10^{-6}$ at 2.45 GHz and the second with a relative shift of $10^{-5}$.

Curve 60 refers to an interference parallel suppression method with only one stage for parallel suppression of interferences and curves 61, 62 to the same method but with shifts of $10^{-6}$ and $10^{-5}$.

Curve 70 refers to a method with two stages for parallel suppression of interferences with associated curves 71, 72 for shifts at $10^{-6}$ and $10^{-5}$.

Finally, curve 80 marks the theoretical limit of the phase difference modulation technique (DQPSK).

The invention claimed is:

1. An apparatus, comprising:
   means for receiving a signal, the signal comprising a preamble comprising a sequence of known symbols spread in frequency by a pseudo-random sequence, followed by a sequence of information symbols spread in frequency by the pseudo-random sequence;
   means for forming a baseband signal based at least in part on the received signal;
   means for performing a correlation between the baseband signal and the pseudo-random sequence at least in a portion of the signal corresponding to information symbols in order to obtain a correlation signal, the correlating means being capable of performing a correlation on at least one of an in-phase component of the baseband signal and a quadrature component of the baseband signal to obtain at least one or more correlation components, the means for performing a correlation comprising;
   means for calculating a DOT signal as a sum of two direct products of successive samples of the correlation components;
   means for calculating a CROSS signal as a difference between two crossed products of successive samples of the correlation components;
   means for estimating a period of the modulation;
   means for calculating a ratio between the CROSS signal and the DOT signal at one or more symbol period, the means for calculating the ratio between the CROSS signal and the DOT signal being capable of multiplying the inverse of an arctangent of the ratio by $\pi/2$ times a number of chips;
   means for demodulating the correlation signal to obtain a demodulation signal;
   means for restoring the information symbols; and
   means for correcting a frequency shift in the received signal, said means for correcting a frequency shift comprising:
      means for processing a portion of the correlation signal corresponding to a preamble of the correlation signal, said processing means being capable of estimating a modulation period affecting the correlation signal resulting from the frequency shift and a correcting signal; and
      means for correcting the correlation signal in a portion of the correlation signal corresponding to the information symbols, said correcting means being capable of correcting the correlation signal via the correcting signal.

2. An apparatus as claimed in claim 1, further comprising means for low pass filtering at least one of the CROSS signal or the DOT signal, or combinations thereof.

3. An apparatus as claimed in claim 1, wherein said correcting means being capable of forming a first component equal to cos $(\pi x/2T)$ and a second component equal to sin $(\pi x/2T)$, wherein x is a unit of time equal to kN, k is a number of successive integer values and N is a number of items of the pseudo-random sequence, and T is a modulation period.

4. An apparatus as claimed in claim 1, wherein said correcting means being capable of correcting base band signals $I_{dop}$ and $Q_{dop}$ by calculating a first quantity equal to:

$$I_{dop} \cdot \cos\,(\pi x/2T) + Q_{dop} \cdot \sin\,(\pi x/2T),$$

which gives a signal (I) specific to the first channel corrected from the frequency shift and/or by calculating a second quantity equal to:

$$Q_{dop} \cdot \cos\,(\pi x/2T) + I_{dop} \cdot \sin\,(\pi x/2T),$$

which gives a signal (Q) specific to the second channel corrected from the frequency shift.

5. An apparatus as claimed in claim 1, wherein said correcting means being capable correcting correlation signals $CORR_{dop}$ (I) and $CORR_{dop}$ (Q) by calculating a first quantity equal to:

$$CORR_{dop}(I) \cdot \cos\,(\pi x/2T) + CORR_{dop}(Q) \cdot \sin\,(\pi x/2T),$$

which gives a correlation signal CORR(I) specific to a first channel corrected from the frequency shift, or by calculating a second quantity equal to:

$$CORR_{dop}(Q) \cdot \cos(\pi x/2T) - CORR_{dop}(I) \cdot \sin(\pi x/2T),$$

which gives a correlation signal CORR(Q) specific to a second channel corrected from the frequency shift, or combinations thereof.

* * * * *

UNITED STATES PATENT AND TRADEMARK OFFICE
CERTIFICATE OF CORRECTION

PATENT NO. : 7,388,901 B2
APPLICATION NO. : 11/331762
DATED : June 17, 2008
INVENTOR(S) : Christophe Boulanger et al.

It is certified that error appears in the above-identified patent and that said Letters Patent is hereby corrected as shown below:

Col. 8, Claim 2 should read as follows:

5. An apparatus as claimed in claim 1, wherein said correction means being capable for correcting correlation signals $CORR_{dop}$ (I) and $CORR_{dop}$ (Q) by calculating a first quantity equal to:

$$CORR_{dop}(I) \cdot \cos(\pi x/2T) + CORR_{dop}(Q) \cdot \sin(\pi x/2T),$$

which gives a correlation signal (CORR(I) specific to a first channel corrected from the frequency shift, or by calculating a second quantity equal to:

$$CORR_{dop}(Q) \cdot \cos(\pi x/2T) - CORR_{dop}(I) \cdot \sin(\pi x/2T),$$

which gives a correlation signal CORR(Q) specific to a second channel corrected from the frequency shift, or combinations thereof.

Signed and Sealed this

Twelfth Day of August, 2008

JON W. DUDAS
*Director of the United States Patent and Trademark Office*

UNITED STATES PATENT AND TRADEMARK OFFICE
CERTIFICATE OF CORRECTION

PATENT NO. : 7,388,901 B2  
APPLICATION NO. : 11/331762  
DATED : June 17, 2008  
INVENTOR(S) : Christophe Boulanger et al.

Page 1 of 1

It is certified that error appears in the above-identified patent and that said Letters Patent is hereby corrected as shown below:

Col. 8, Claim 2, lines 38-40 should read as follows:

5. An apparatus as claimed in claim 1, wherein said correction means being capable for correcting correlation signals $CORR_{dop}(I)$ and $CORR_{dop}(Q)$ by calculating a first quantity equal to:

$$CORR_{dop}(I) \cdot \cos(\pi x/2T) + CORR_{dop}(Q) \cdot \sin(\pi x/2T),$$

which gives a correlation signal (CORR(I) specific to a first channel corrected from the frequency shift, or by calculating a second quantity equal to:

$$CORR_{dop}(Q) \cdot \cos(\pi x/2T) - CORR_{dop}(I) \cdot \sin(\pi x/2T),$$

which gives a correlation signal CORR(Q) specific to a second channel corrected from the frequency shift, or combinations thereof.

This certificate supersedes the Certificate of Correction issued August 12, 2008.

Signed and Sealed this

Sixteenth Day of September, 2008

JON W. DUDAS  
*Director of the United States Patent and Trademark Office*